Aug. 15, 1961  G. JOHNSON  2,996,283
FENCE STRETCHING TOOL
Filed Nov. 5, 1958  2 Sheets-Sheet 1

INVENTOR.
GRADY JOHNSON
BY
Marechal, Biebel, French & Bugg
ATTORNEYS

Aug. 15, 1961 G. JOHNSON 2,996,283
FENCE STRETCHING TOOL
Filed Nov. 5, 1958 2 Sheets-Sheet 2
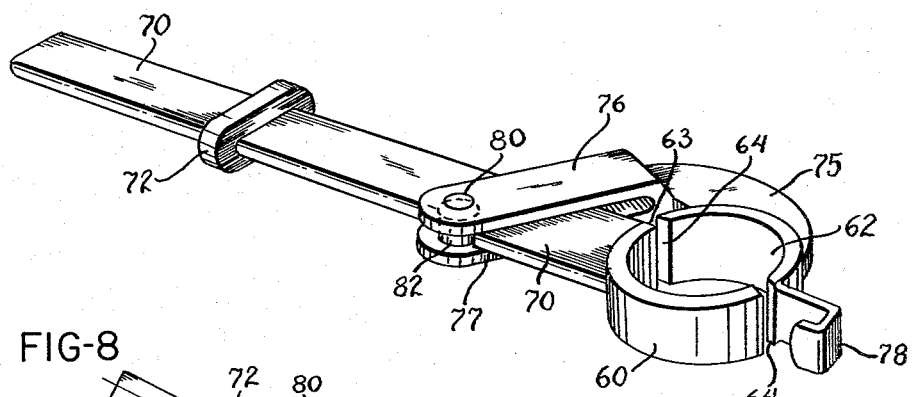
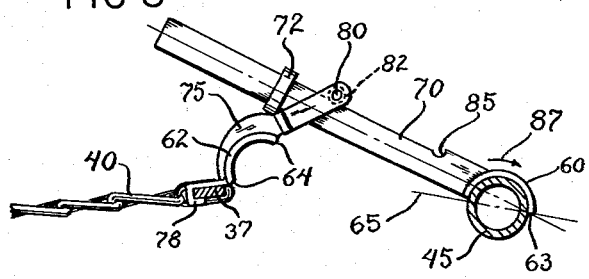
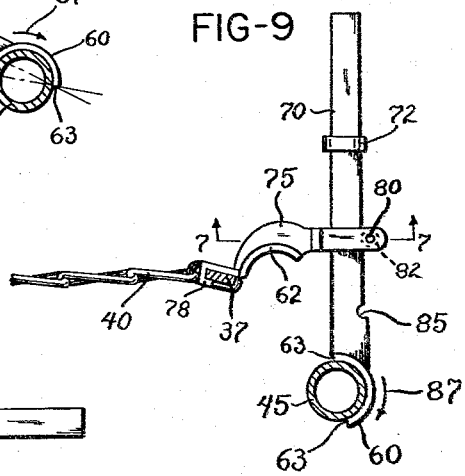
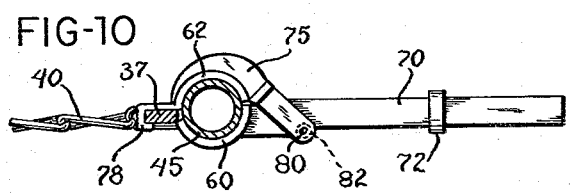
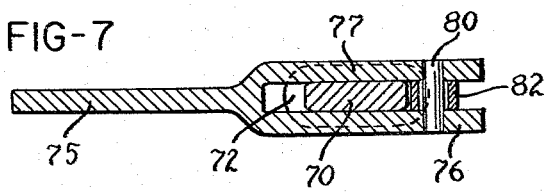
INVENTOR.
GRADY JOHNSON
BY
ATTORNEYS

United States Patent Office 2,996,283
Patented Aug. 15, 1961

2,996,283
FENCE STRETCHING TOOL
Grady Johnson, 338 Stonemill Road, Dayton 9, Ohio
Filed Nov. 5, 1958, Ser. No. 772,120
5 Claims. (Cl. 254—77)

This application relates to a stretching tool particularly adapted for stretching panels of fencing such as chain link fabric and the like, and for retaining the stretched panel in position with respect to a fence framework or post during permanent attachment thereof to the post.

The normal type of chain link fence includes spaced posts set in the ground, and between which the chain link fabric is stretched to provide a fence panel which is maintained under tension and thus substantially straight and rigid. In some constructions of such fences the posts may be joined by horizontal pipes or bars between which the fabric is stretched, thus providing a complete framework about the stretched fencing material or fabric.

The fabric is secured to the posts through a bar which is interlaced in the ends of the fabric, and which is engaged by suitable clamp rings having jaws which extend from the post, around which the clamp rings are received, past the bar. A bolt or the like through the ends of the jaws on the opposite side of the bar from the post then serves to retain the bar and the fabric in position. The normal practice in erecting such fences is to cut the fabric material somewhat short initially, and then to stretch the fabric to provide a fence that is relatively rigid, maintaining the fabric constantly under tension. Various stretching tools are supplied for this purpose, but for the most part they are cumbersome, require considerable manipulation in performing the stretching operation, and are of such size as to be of little use in stretching a panel to a post which is mounted adjacent a wall or some surface where space is limited.

Accordingly, the primary object of this invention is to provide a fence stretching tool which is of economical construction, embodying few parts, which therefore cannot readily get out of adjustment or be damaged, and which may be manipulated quickly and effectively to stretch the panel of fencing material into position and to maintain the panel in stretched position while permanent mountings are applied thereto.

Another object of the invention is to provide such a stretcher which incorporates a pair of jaws hinged to each other and having mating ends which mate along a plane extending to one side of the hinge axis, and having a hook at one end of one of the jaws, such that when tension is applied through the hook with jaws in closed position the entire device will act as an over-center mechanism urged to the "jaw closed" position by the force applied through the hook from the stretched fencing.

Other objects and advantages of this invention will be apparent from the following description, the accompanying drawing and the appended claims.

In the drawing—

FIG. 6 is a perspective view of a modified type of stretching tool in accordance with the invention;

FIG. 7 is a partial sectional view taken on line 7—7 of FIG. 9; and

FIGS. 8, 9 and 10 are views similar to FIGS. 3 and 4 illustrating the operation of the modified stretching tool.

Figure 1:
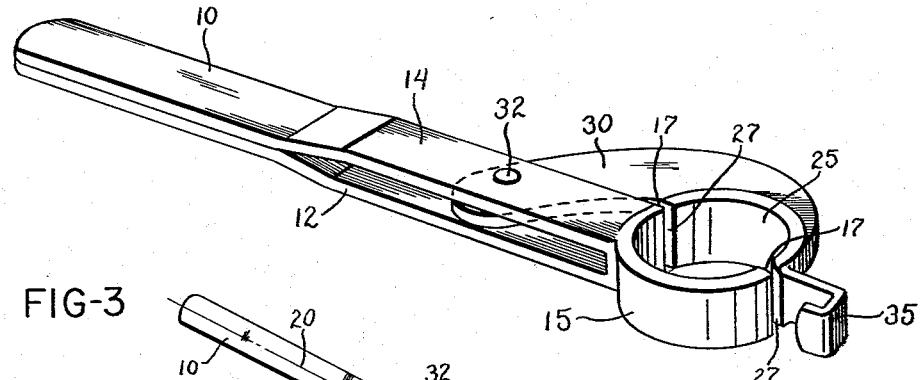
FIG. 1 is a perspective view of a stretching tool in accordance with the invention, with the jaws in closed position.

Referring to the drawing, which illustrates a preferred embodiment of the invention, the stretching tool is provided with a handle 10 having parallel spaced arms 12 and 14 extending from the forward end thereof and secured to a semi-cylindrical jaw member 15, as by welding thereto. The jaw member thus provides an arcuate bearing surface for engagement with a fence post. The opposite edges or faces 17 of this jaw extend through a plane, indicated by the dot-dash line 18 in FIG. 3, which is at an angle, and therefore intersects, a vertical plane extending longitudinally through the handle 10, as indicated by line 20 in FIG. 3. A movable jaw 25 of substantially the same semi-cylindrical configuration as jaw 15, and having edges or faces 27 which are engageable with the faces 17 of jaw 15, is carried upon a mounting arm 30. This arm extends around the outer surface of jaw 25, as shown in FIG. 1 and may be formed integrally therewith or may be welded or otherwise secured thereto in any suitable manner.

Figure 3:
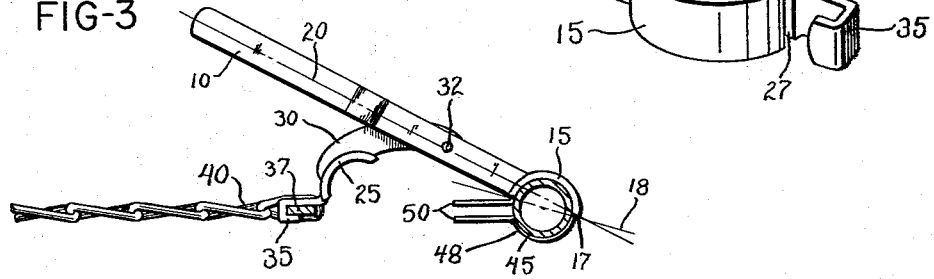
FIGS. 3 and 4 are plan views of the tool in the open position, as in FIG. 2, and in the closed position where the stretching operation is completed.

The end of arm 30 opposite jaw 25 is received between the spaced arms 12 and 14 of the handle, and is connected thereto through a hinge pin 32. The location of hinge pin 32 is spaced from jaw 15 a distance substantially equal to the distance between the engagement of hinge pin 32 with arm 30 and the movable jaw 25. This relation determines the effective open length of the stretching tool, as shown in FIG. 3.

At the free or outer end of movable jaw 25 a hook member 35 extends with its hook opening facing inwardly toward the jaws when the tool is in closed position, as shown in FIG. 1. This hook member is adapted to be engaged with the end bar 37 received through the ends of the chain link fabric 40 to be stretched, as shown in FIGS. 2 and 3.

Figure 2:
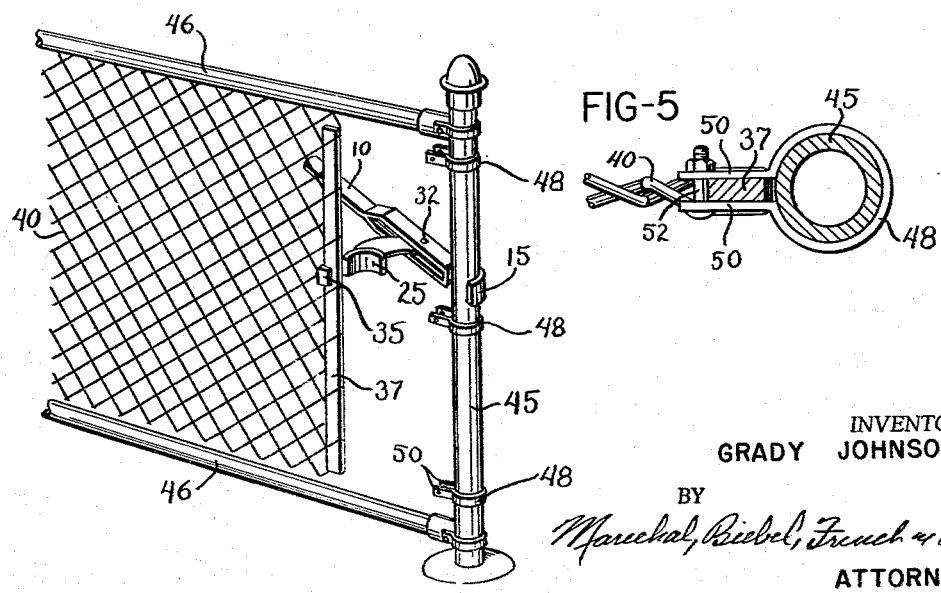
FIG. 2 is a perspective view of the tool as used for stretching of a panel of fencing fabric.

Referring to FIG. 2, the stretching tool is shown in position preparatory to stretching a panel of chain link or like fencing fabric. Thus, the fence structure includes a vertical post 45 which is suitably secured in the ground, and to which is secured the horizontal lengths of pipe or the like 46 which provide the fencing framework. The opposite end of the fence panel is provided by a similar post (not shown) to which the fabric 40 is secured by a bar (similar to bar 37) having a plurality of clamp rings which pass around the post and on opposite sides of the bar, being secured therearound by a bolt which passes through the ends of the clamp jaws on the opposite side of the bar from the fence post. The fabric is then placed in position for stretching and the bar 37 is inserted in the end of the fabric to be pulled, as shown in FIG. 2. The hook member 35 is engaged with bar 37 and the fixed jaw 15 is placed about the fence post 45, as shown in the drawing, and the handle 10 is then rotated to bring the movable jaw 25 into engagement with the post 45 on the opposite side thereof from jaw 15. During this operation the jaw 15 operates around the post providing a bearing against which the stretching force is exerted.

Figure 4:
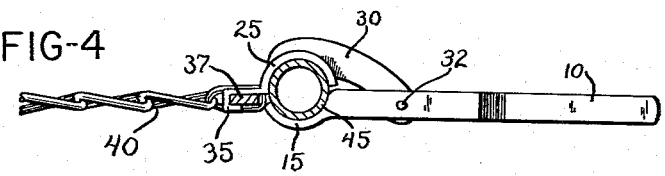
Figure 5:
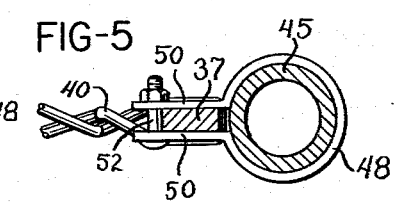
FIG. 5 is a sectional view on an enlarged scale through one of the retaining or mounting clamps and the mounting bar interlaced with the end of the fencing fabric.

When the jaws 15 and 25 are brought together around the post, as shown in FIG. 4, the bar 37 is drawn up adjacent the post, and the hinge axis (pin 32) has moved around the post to the opposite side from the arm 30 of a plane extending through the post and along the length of the fence fabric panel. Thus, the tension induced in the fabric panel 40 produces a force acting along the plane of the fabric which tends to close the jaws of the stretching tool since the hinge axis has moved over-center, i.e. across the plane of the fabric in which the force resultant from tension acts, and the tool may be left in this position while the clamp rings 48 are secured. Therefore, the jaws engage around the post, and depending upon the size of the post they may actually engage, as previously mentioned, or they may fit tightly about the post as shown in FIG. 4 with the surfaces or faces 17 and 27 spaced slightly apart. The fencing fabric does not interfere with the movement of the jaws, as might be thought from inspection of FIG. 4, since, by comparison with FIG. 2, it will be noted that the tool is applied to the stretching bar 37 at a point between portions of the fencing fabric wires which loop around the bar. Thus, referring to FIG. 5, a clamp ring 48 is shown having arms 50 extending on opposite sides of bar 37 and receiving a bolt and nut fastener 52 which extends on the opposite side of bar 37 from post 45. The usual practice is to provide three such clamp rings which then retain the bar 37 and the fence panel in erected position and the stretching tool may be opened and removed.

It will be appreciated therefore that the present invention provides a stretching tool which is of simple and economical construction, which has but one moving part, which is not likely to get out of adjustment, and which is readily and easily manipulated. The tool has been found to speed up the fence erecting job considerably, and due to its relative short length it may be employed in situations where the post against which the fabric panel is being stretched is relatively close to a building or other obstruction, since there need be only room to swing the arm 10 around the post. In a tool constructed in accordance with the invention the length of the handle from its connection to jaw 15 to its outer end is slightly in excess of 10 inches, this length having been found sufficient to provide proper leverage under most circumstances. The outer end of handle 10 is of such cross section that it may be received within a length of pipe to provide additional length for added leverage if a situation is encountered where additional force is needed for stretching a long panel. The jaw members 15 and 25 may be constructed to suitable dimensions, the preferred dimension being an internal diameter in the closed position of approximately 2 inches, since this size fits about the most commonly used fence post.

FIGS. 6–10 show a modified form of stretching tool having increased reach, as may be desired under some circumstances. In this construction the complementary jaw members 60 and 62 meet along mating faces 63 and 64, respectively, in a plane as indicated generally by the dot-dash line 65 in FIG. 8. A handle 70 is secured to jaw 60 and extends therefrom at an angle with respect to the plane through the mating faces of the jaws. This handle may be formed preferably from flat steel bar stock, and includes an enlarged collar portion 72.

The arm 75 extending from jaw member 62 includes a bifurcated extension providing the arms 76 and 77 which receive the portion of handle 70 adjacent the jaw member 60. The bar engaging hook 78 is secured to the opposite end of jaw member 62 and opens inwardly toward the jaw member, in the same manner as the hook 35 described previously. A pin 80 extends through the arms 76 and 77 on the opposite side of handle 70, and preferably is surrounded by a suitable bushing 82 providing a roller contact with the side of handle 70. A recess or notch 85 (FIGS. 8 and 9) is formed in the edge of handle 70 adjacent the roller at a position to define a pivot axis wherein the jaw members may be moved to closed position as shown.

Therefore, referring to FIGS. 8 and 9, with the tool in the open position the arm and movable jaw member 62 may swing open and slide away from the jaw member 60, the rearward movement of the bifurcated arm being limited by the collar 72. When the hook engages a bar 37 in the fencing fabric 40 and the arm is rotated as shown by arrows 87, the bifurcated arm will first roll along the surface of handle 70 until the roller drops into the notch 85, after which the arm and movable jaw member 62 will pivot to the closed position (FIG. 10), with the handle moving over center, across the plane of the fencing fabric, and the jaws will be biased to closed position due to the tension induced in the stretched fencing fabric until the permanent retainer clamps are placed, as previously described.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. A stretching tool for stretching chain link fabric and fencing by engaging with a stretching and retaining bar received through one end of the fabric and drawing the bar toward a fixed fence post, comprising an elongated handle, said handle having a relatively thin arcuate jaw extending from one end thereof forming a bearing surface of substantial width for engagement with the fence post, said jaw terminating at its outward end short of a plane extending transversely thereof through the longitudinal center line of said handle, an arm having a pivotal mounting at one end thereof engaged with said handle intermediate the ends of said handle, said arm extending from said mounting outwardly to one side of said handle and being swingable in a generally arcuate path along said one side of said handle, a hook portion on the outer end of said arm opposite from said mounting and formed to open inwardly toward said handle, said hook portion adapted to engage a stretching bar, and stop means on said outer end of said arm engageable with said jaw forming a stop for said arm in which said handle is swung to the opposite side of the plane of the fence fabric from said arm and force exerted upon said tool through said hook portion by tension in the fabric will tend to move said pivotal mounting about the post in a direction opposite to the extension of said arm.

2. A stretching tool as defined in claim 1 wherein said pivotal mounting is maintained at a fixed location on said handle.

3. A stretching tool as defined in claim 1 wherein said arm includes a bifurcated extension extending around said handle, said pivotal mounting includes a roller contacting the side of said handle oposite from said one side away from which said arm extends, and a recess is formed in said opposite edge of said handle for receiving said roller to define a pivot axis about which said arm may swing, and a stop on said handle outwardly of said recess defining the length of translatory movement of said arm away from said jaw member.

4. A stretching tool for stretching chain link fabric and fencing by engaging with a stretching bar received through one end of the fabric and drawing the bar toward a fixed fence post, comprising an elongated handle, said handle having an elongated generally arcuate jaw extending from one end thereof forming a bearing surface for bearing engagement with a fence post, said jaw terminating at its outward end short of a plane extending transversely thereof through the longitudinal center line of said handle, an arm having a pivotal mounting at one end thereof engaged with said handle intermediate the ends of said handle, said arm extending from said mounting outwardly to one side of said handle and being swingable in a path along said one side of said handle, a hook portion on the outer end of said arm opposite from said mounting and formed to open inwardly toward said handle, said hook portion being adapted to engage with a stretching bar to exert a tensioning force on the fabric, and stop means on said outer end of said arm adjacent said hook portion and engageable with said outer end of said jaw forming a stop for said arm to limit movement of said hook portion when it is swung beyond said plane through the center line of said handle and a force exerted upon said tool through said hook portion by the tension in the fabric will tend to move said pivotal mounting about the post in a direction opposite to the extension of said arm and maintain the tool in operative position on the post.

5. A stretching tool for stretching chain link fabric and fencing by engaging with a bar received through one end of the fabric and drawing the bar toward a fixed fence post, comprising an elongated handle, said handle having a first relatively thin jaw extending from one end thereof providing an arcuate bearing surface of substantial width for bearing engagement with a fence post, said jaw terminating at its outward end short of a plane extending transversely thereof through the longitudinal center line of said handle, an arm having a pivotal mounting at one end thereof engaged with said handle intermediate the ends of said handle, said arm extening from said mounting outwardly to one side of said handle and being swingable in a generally arcuate path along said one side of said handle, a hook portion on the outer end of said arm opposite from said mounting and formed to open inwardly toward said handle, and a second arcuate jaw secured to said outer end of said arm adjacent said hook portion and cooperable with said first jaw to surround the post when said hook portion is swung beyond said plane through the length of said handle and a force exerted upon said tool through said hook portion by the tension created in the fabric will tend to move said pivotal mounting about a post in a direction opposite to the extension of said arm and maintain said jaws closed about the post.

References Cited in the file of this patent

UNITED STATES PATENTS

| 705,504 | Whipple | July 22, 1902 |
| 1,079,127 | Holland | Nov. 18, 1913 |

FOREIGN PATENTS

| 8,159 | Great Britain | Mar. 31, 1914 |